United States Patent
Yoshida et al.

(10) Patent No.: US 7,177,529 B2
(45) Date of Patent: Feb. 13, 2007

(54) OPTICAL RECORDING APPARATUS, OPTICAL RECORDING METHOD, AND DIGITAL STILL CAMERA

(75) Inventors: Chisato Yoshida, Saitama (JP); Hiroshi Maeda, Kanagawa (JP)

(73) Assignee: Sony Corporation, Tokyo (JP)

(*) Notice: Subject to any disclaimer, the term of this patent is extended or adjusted under 35 U.S.C. 154(b) by 1240 days.

(21) Appl. No.: 09/875,002
(22) Filed: Jun. 7, 2001

(65) Prior Publication Data

US 2001/0051033 A1    Dec. 13, 2001

(30) Foreign Application Priority Data

Jun. 12, 2000    (JP)    .............................. 2000-175889

(51) Int. Cl.
   H04N 5/00    (2006.01)
   H04N 5/95    (2006.01)
   H04N 5/91    (2006.01)
   H04N 7/26    (2006.01)

(52) U.S. Cl. .......................... 386/117; 386/91; 386/96; 386/107; 386/124; 386/126; 358/906

(58) Field of Classification Search ................. 360/44, 360/53, 54, 58, 59, 60, 116, 124, 75; 358/209, 358/906; 386/46, 91, 124–126

See application file for complete search history.

(56) References Cited

U.S. PATENT DOCUMENTS

| 5,274,457 A | * | 12/1993 | Kobayashi et al. | ...... 348/231.9 |
| 5,347,505 A | * | 9/1994 | Moritsugu et al. | ....... 369/59.12 |
| 6,335,910 B1 | * | 1/2002 | Yoshizawa et al. | ...... 369/53.18 |

FOREIGN PATENT DOCUMENTS

| EP | 0 473 516 | 3/1992 |
| EP | 0 962 928 | 12/1999 |

* cited by examiner

*Primary Examiner*—Thai Q. Tran
*Assistant Examiner*—Mishawn Dunn
(74) *Attorney, Agent, or Firm*—Oblon, Spivak, McClelland, Maier & Neustadt, P.C.

(57) ABSTRACT

A digital still camera includes a vibration detector for detecting vibrations. In accordance with certain conditions, a control unit controls finalization (session closing) which enables a CD-ROM drive to read data recorded on a recording medium. The control of session closing includes starting session closing after a predetermined period of time elapses since the selection of the execution of session closing. The countdown id displayed to indicate the time remaining before the start of session closing. After the countdown is completed, or when the vibration detector detects vibrations during the countdown until the start of session closing, session closing is not started.

27 Claims, 11 Drawing Sheets

FIG. 6

| FRAME NO. | CONTENTS OF FRAME |
|---|---|
| N | SPECIAL INFORMATION 1 |
| N+1 ⋮ N+9 | NORMAL TIME CODE |
| N+10 | SPECIAL INFORMATION 2 |
| N+11 ⋮ N+19 | NORMAL TIME CODE |
| N+20 | SPECIAL INFORMATION 3 |
| N+21 ⋮ | NORMAL TIME CODE |

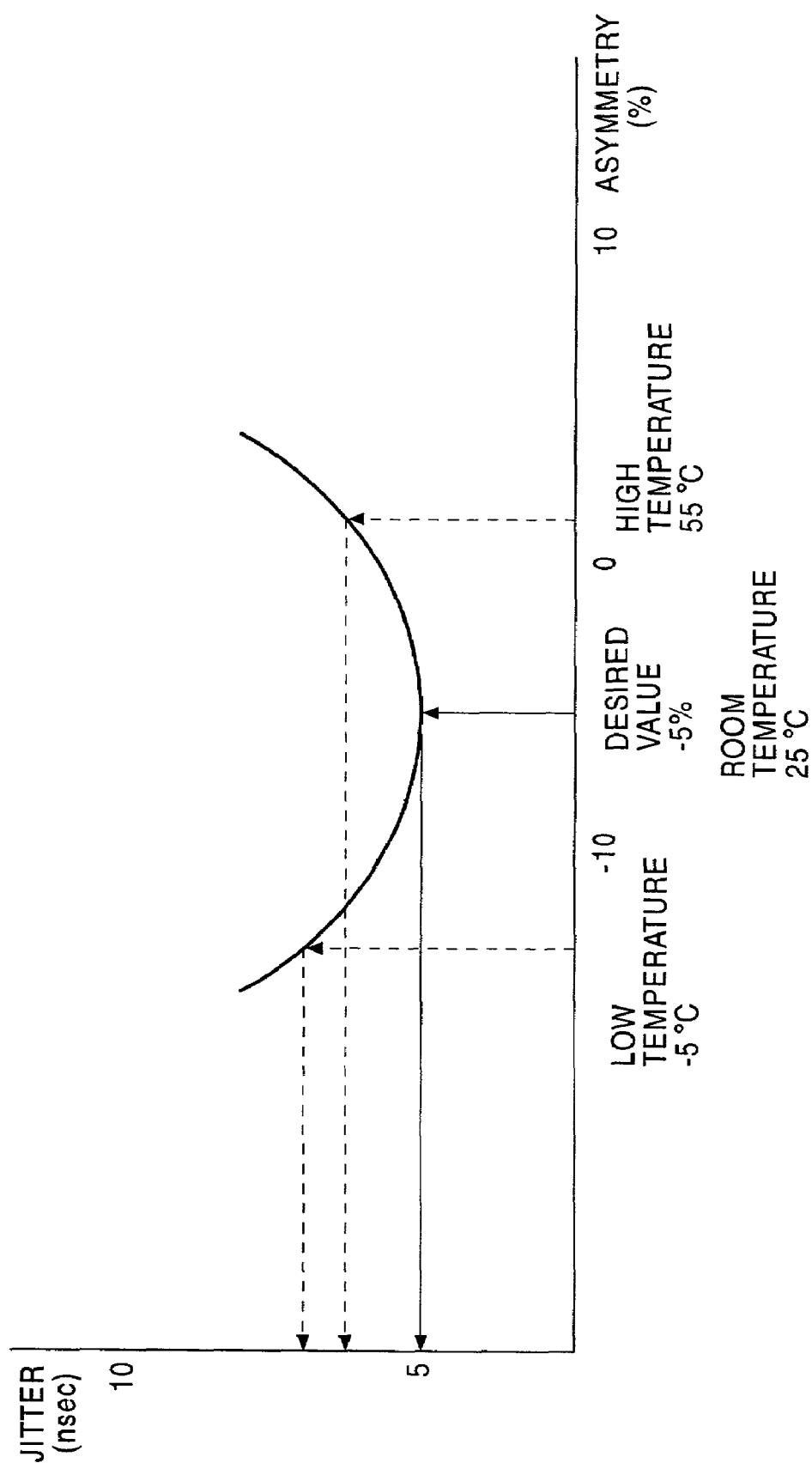

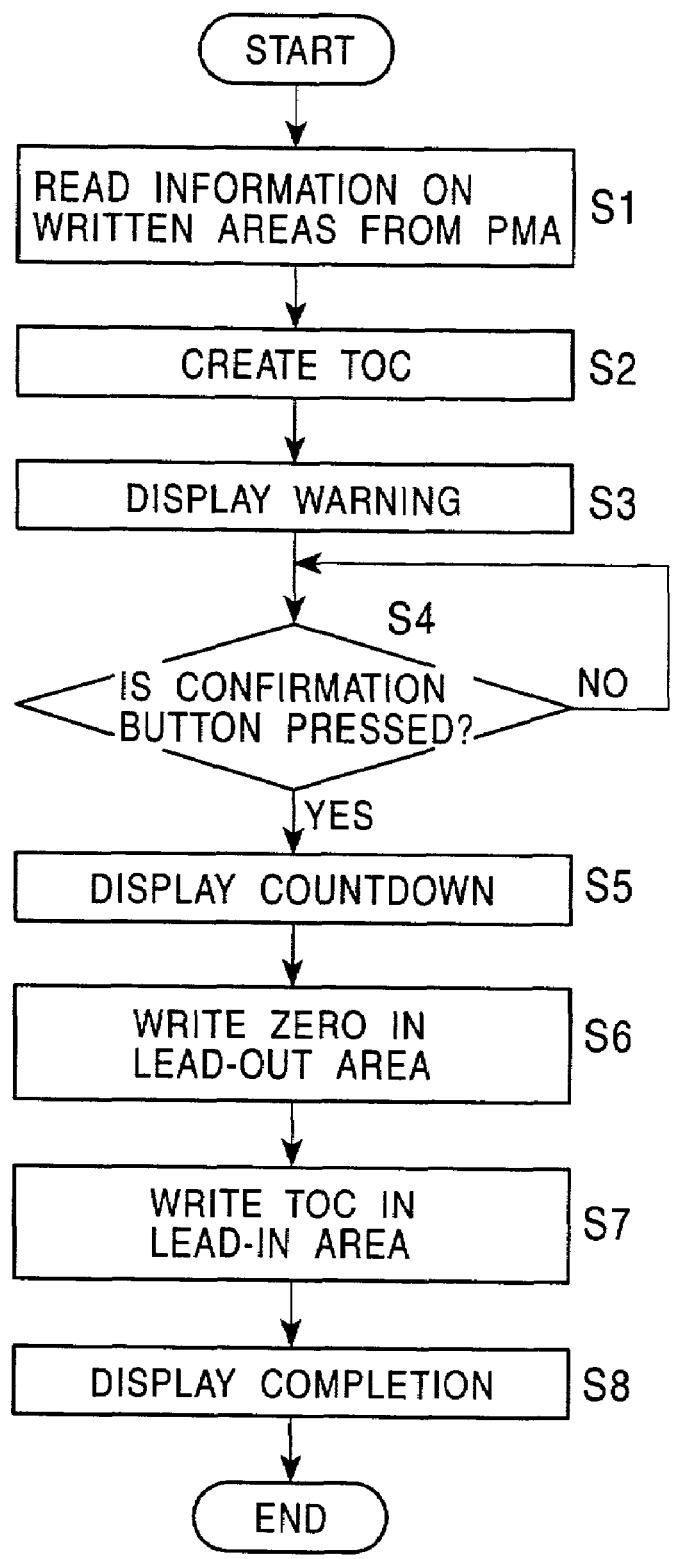

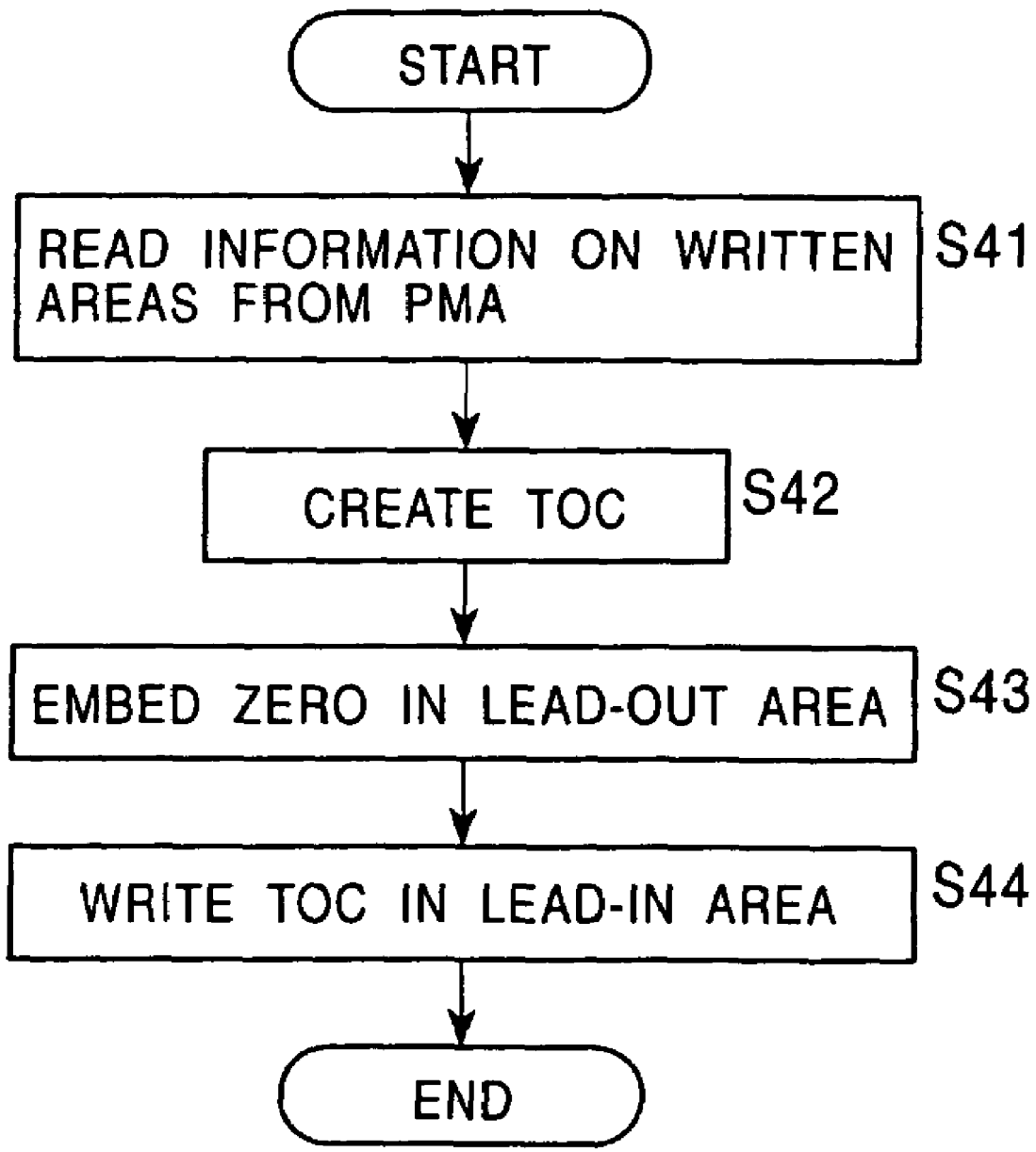

OPTICAL RECORDING APPARATUS, OPTICAL RECORDING METHOD, AND DIGITAL STILL CAMERA

BACKGROUND OF THE INVENTION

1. Field of the Invention

The present invention relates to optical recording apparatuses, optical recording methods, and digital still cameras for recording data on recording media by utilizing a laser beam, and more particularly relates to an optical recording apparatus, an optical recording method, and a digital still camera for controlling a session closing in order to enable a reading apparatus to read data written in a recording medium.

2. Description of the Related Art

Disc recording media (hereinafter referred to as optical discs), such as compact discs (CDs), which utilize optical mark reading have a large storage capacity and can be accessed randomly. Since optical mark reading is contactless, it does not involve risks such as head crashes and abrasion and damage caused by reading, compared with contact type recording media, such as magnetic tapes. Because the surface of a disc is robust, the risk of accidentally losing data is low. Accordingly, optical discs have many advantages and are suitable as computer peripheral memory and recording media in which data can be created and stored reliably.

Recently, read-write apparatuses which utilize a so-called CD-R (compact disc-recordable), which is a write-once optical disc, have been developed. Among CD-R's, there is one type of CD-R in which data is easily written in accordance with all standard formats used in compact discs such as CD-ROM (compact disc read only memory), CD-ROM/XA (CD-ROM extended architecture), CD-I (compact disc interactive), and CD-DA (compact disc digital-audio). In place of conventional magnetic tapes and magnetic discs, CD-R's are installed in electronic apparatuses and are used as media from and/or to which data is read and/or written.

Since data to be recorded is written to a CD-R in an incremental manner, table of contents (TOC) information, which is recorded on the disc inner perimeter of a CD-ROM or the like, cannot be written when the CD-R is still in a recordable state.

In other words, no finalization (session closing) is performed until it becomes impossible to write any more data to the CD-R. Subsequently, the TOC information, which is index information for the recording medium, is written.

When no finalization is performed, that is, when the CD-R is in a recordable state, the start position for writing data and the recorded position for reading data can be detected by referring to a provisional TOC written in a program memory area (PMA) of the recording medium. A CD-ROM drive cannot read the provisional TOC written in the PMA, and hence it is impossible for the CD-ROM drive to read a write-once recording medium which is not finalized. In order to enable the CD-ROM drive to read the write-once recording medium, it is necessary to perform finalization.

Referring to FIG. 12, a finalization process (session closing process) performed by a conventional recording apparatus is described.

In response to an instruction by the user to perform session closing, in step S41, the process reads information concerning written areas including provisional TOC information from a PMA of a recording medium.

In step S42, the process creates a normal TOC based on the information on the written areas.

In step S43, the process embeds zero in a lead-out area.

In step S44, the process writes the normal TOC in a lead-in area. When the writing is completed, the session closing is completed.

In session closing, a 23.5-Mbyte user data area is consumed by writing the lead-in area and lead-out area according to the standard.

Concerning conventional recording apparatuses, finalization of a write-once recording medium enables a CD-ROM drive to read the write-once recording medium.

When performing session closing in which session-closing data is written to a recording medium, a regular single-speed recording apparatus requires approximately 3 minutes and 40 seconds for closing a first session and approximately 1 minute and 30 seconds for closing second and subsequent sessions.

When performing session closing, a conventional recording apparatus has to record a large amount of data, especially when performing session closing for the first time. It therefore requires a long period of time to perform session closing.

A shock or vibration to the recording apparatus during session closing may cause the recording apparatus to fail in session closing. When the recording apparatus fails in session closing, it is difficult for the recording apparatus to retry session closing. Due to a failure in session closing, it may become impossible to read data recorded on the recording medium.

SUMMARY OF THE INVENTION

Accordingly, it is an object of the present invention to provide an optical recording apparatus, an optical recording method, and a digital still camera capable of preventing trouble which occurs in session closing.

According to an aspect of the present invention, the foregoing objects are achieved through provision of an optical recording apparatus for recording data on a recording medium by optical recording, which includes a write unit for writing data to the recording medium. A control unit controls session closing for enabling another reading apparatus to read the written data. The control unit performs session closing in accordance with conditions for session closing.

The control unit may start session closing after a predetermined period of time elapses since reception of a signal to perform session closing. The optical recording apparatus may further include a vibration detector for detecting vibrations. When the vibration detector detects vibrations, the control unit may not start session closing. The recording medium may include one of a write-once recording medium and a rewritable recording medium.

According to another aspect of the present invention, the foregoing objects are achieved through provision of an optical recording method for recording data on a recording medium by optical recording, which includes the steps of writing data to the recording medium and performing session closing for enabling another reading apparatus to read the written data in accordance with conditions for session closing.

Session closing may not be started after a predetermined period of time elapses since reception of a signal to perform session closing. The optical recording method may further include a vibration detecting step of detecting vibrations. When vibrations are detected in the vibration detecting step, session closing may not be started. The recording medium may include one of a write-once recording medium and a rewritable recording medium.

According to another aspect of the present invention, the foregoing objects are achieved through provision of a digital still camera which includes an image pickup unit for capturing an image of a subject. An image processing unit processes the captured image data. A read-write unit reads data from and/or writes data to a recording medium. A control unit controls session closing for enabling a reading apparatus to read the recorded data. The control unit performs session closing in accordance with conditions for session closing.

The control unit may start session closing after a predetermined period of time elapses since reception of a signal to perform session closing. The digital still camera may further include a vibration detector for detecting vibrations. When the vibration detector detects vibrations, the control unit may not start session closing. The recording medium may include one of a write-once recording medium and a rewritable recording medium.

According to the present invention, it is possible to prevent a session closing failure which occurs during session closing or incomplete session closing.

BRIEF DESCRIPTION OF THE DRAWINGS

FIG. 6 illustrates the frame structure of absolute time in pregroove (ATIP) information written in a lead-in area of the recording medium used in the digital still camera of the embodiment;

FIG. 10 is a graph showing the relationship between the asymmetry value computed by the digital still camera of the embodiment when the writing is performed and a recording jitter value;

FIG. 11 is a flowchart showing a session closing process performed by the digital still camera with respect to the recording medium; and FIG. 12 is a flowchart showing a finalization process (session closing process) performed by a conventional recording apparatus.

DESCRIPTION OF THE PREFERRED EMBODIMENTS

Figure 1:
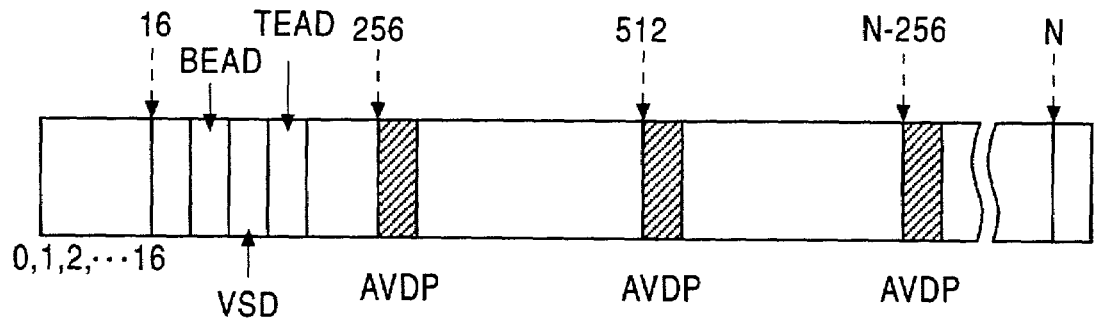
FIG. 1 illustrates the structure of a unit (hereinafter referred to as a volume) on a removable recording medium for storing files and the like in a file system in compliance with a universal disc format (UDF)

The present invention will become apparent from the following description of the preferred embodiment with reference to the accompanying drawings.

A digital still camera according to an embodiment of the present invention writes captured image data to a write-once recording medium and reads image data from the recording medium based on a file system in compliance with a universal disc format (UDF). The digital still camera controls finalization (session closing) for enabling another reading apparatus to read recorded image data in accordance with conditions. Specifically, the control of session closing includes starting session closing after a predetermined period of time elapses since the execution of session closing is selected by a user and displaying the time until session closing is started. Also, when the user selects the execution of session closing, it is requested that the digital still camera should be placed on a stable object. When a vibration detector detects vibrations, session closing is not started.

The digital still camera of the embodiment will now be described in detail.

The UDF is one definition for writing character codes of a file name and file attributes which are available for various media such as a CD-R, WORM (write-once read-many optical disc), CD-R/RW (compact disc-recordable/rewritable), MO (magneto-optical disc), and DVD (digital versatile disc). The UDF is endorsed by the Optical Storage Technology Association (OSTA).

In other words, the UDF is a system in which data can be written by any operating system (OS) and written files can be compatibly read by any OS.

In the UDF, a file entry information control block (ICB) is used as the main data structure. In the UDF, all files and directories have a unique ICB. In this embodiment, a file which stores actual data such as image data for a captured image is generally written prior to the ICB which defines the file. When a file is stored in a plurality of extents (data streams), a list of extents is included in the ICB.

In the UDF, a mapping table which is referred to as a virtual allocation table (VAT) is used to allocate a sequential number (virtual address) to each file so that it is possible to make a virtual reference. In a file system in compliance with the international standard ISO 9660, each file or each directory on a recording medium is directly referred to by a logical address. In contrast, in the UDF, each file or each directory is referred to by the above-described virtual address. The VAT can be placed at any position on a track, and the VAT can be referred to by a VAT ICB which indicates the position of the VAT.

In the UDF, it is defined that the VAT ICB is placed at a last-recorded physical address on the recording medium. Although the VAT is divided and placed on a plurality of extents, the VAT ICB includes a VAT extent list. In the UDF, when a file is modified in one way or another, it is not necessary to change the entirety of a series of file pointers. It is necessary to only change the VAT ICB in order to arrive at the changed file.

FIG. 1 shows the structure of a unit (hereinafter referred to as a volume) on a removable recording medium which stores files and the like in a file system in compliance with the UDF.

In the file system in compliance with the UDF, it is assumed that the head of a session is sector 0. Between a beginning extended area descriptor (BEAD) recorded in sectors from sector 16 onward and a terminating extended area descriptor (TEAD), a volume structure descriptor (VSD) is placed. In the VSD, information for recognizing the UDF file system is written.

In the file system in compliance with the UDF, when the recording medium is in a state in which data is still writable thereto and a session is not closed yet, recording of an anchor volume descriptor pointer (AVDP) at which an optical head first reads data in order to arrive at a file is authorized. If the head of the session is sector 0, the AVDP is written in a sector having a logical block number (LBN) of 512.

In other words, when the AVDP is stored in sector 512, it can be concluded that the data is written based on the file system in compliance with the UDF. By performing session closing of the recording medium, the AVDP is written in two sectors, i.e., LBN=sector 256 and LBN=(LBN of last written sector)−256. After session closing is performed, the ADVP written in sector 512 is not used when reading data. The AVDP indicates a volume descriptor sequence (VDS). The VDS is written on sectors from sector 512 onward.

The VDS is a set of descriptors indicating information concerning the contents of the volume structure. The VDS includes volume information and partition information such as a primary volume descriptor, a logical volume descriptor (hereinafter referred to as an LVD), an application volume descriptor, a virtual partition descriptor, and an actual partition descriptor.

There are two types of partitions. One is an actual partition, and the other is a virtual partition. The actual partition includes the actual logical address of data recorded on the recording medium. In contrast, the virtual partition includes a table based on the virtual address of data. In other words, the virtual partition is a partition obtained by remapping the entire recording area of the recording medium from the physical address to the virtual address. The virtual partition is defined by the VAT.

In the VDS, two descriptors indicating the actual partition and the virtual partition are placed. When the partition number is zero, the file system refers to the actual partition, that is, to the actual logical address. When the partition number is one, the file system refers to the virtual partition (VAT).

The LVD in the VDS is a file set descriptor sequence (FSDS), that is, a set of file sets in the volume. Each FSDS indicates a root directory information control block (RDICB). The RDICB includes information such as a specific directory name, file name, and the like.

In the file system in compliance with the UDF which is suitable for packet writing, there are two schemas. One schema is a file entry ICB for identifying each file in the file system, and the other schema is a file identifier descriptor (FID). The FID indicates the physical address of the file entry ICB or indirectly indicates the file entry ICB through the VAT.

A directory which is referred to by the RDICB is configured as a table of related FIDs. The file entry ICB includes extent lists for all stored files, dates, and file attributes. The contents of the file entry ICB are physical addresses which may be changed when files are modified or edited.

The FID indicates the file entry ICB. A file entry which is referred to by the file entry ICB indicates the actual file. Since a directory is one type of file, the file entry can indicate the directory. In the file system in compliance with the UDF, a tree-shaped hierarchical structure is formed.

A root directory can be referred to by the RDICB. The root directory includes an FID for referring to a file entry ICB or an FID for indicating a directory entry ICB.

For example, the FID has information such as "partition 1/block 200". If the partition number is one, it is a virtual partition. Hence, the file system does not directly go to the logical address #200 in order to find a file. Instead, the file system refers to the VAT, and the VAT in turn indicates the logical address.

Figure 2:
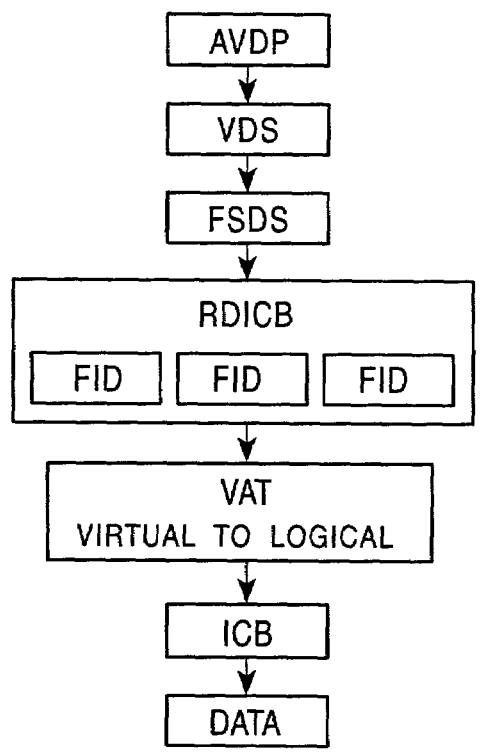
FIG. 2 is a chart showing a file seeking process in the file system in compliance with the UDF.

With the above-described file system, the UDF performs a file seeking process shown in FIG. 2.

An optical head reads the last area from among written areas on a disc. In this area, the VAT ICB is written. Based on the VAT ICB, the VAT is read.

The optical head refers to the AVDP. Subsequently, the optical head refers to the VDS written in the AVDP.

Based on the VDS, it is determined whether the partition is an actual partition or a virtual partition.

Also, the FSDS is referred to by the VDS. In the FSDS, the RDICB is indicated. In the RDICB, the root directory is indicated. In the root directory, the FID indicates the ID of each file.

When the partition flag in the VDS in the root directory formed of the FID indicates an actual partition, direct reference to the physical address of the file entry ICB is made. In contrast, when the flag indicates a virtual partition, reference to the file entry ICB is made through the VAT. As a result, the file seeking process arrives at a desired file.

Provision of the VAT between the FID and the file entry ICB ensures that, even when the file entry ICB is rewritten, the file entry ICB is virtually rewritten by changing the address of the file entry ICB on the VAT.

Even when the location of the file entry ICB is changed by changing the contents of the root director, it is not necessary to rewrite the FID when the VAT is changed.

In the file system in compliance with the UDF, the above-described seeking process enables a sequentially writable recording medium to be handled as if it were a random access read-write recording medium.

Figure 3:
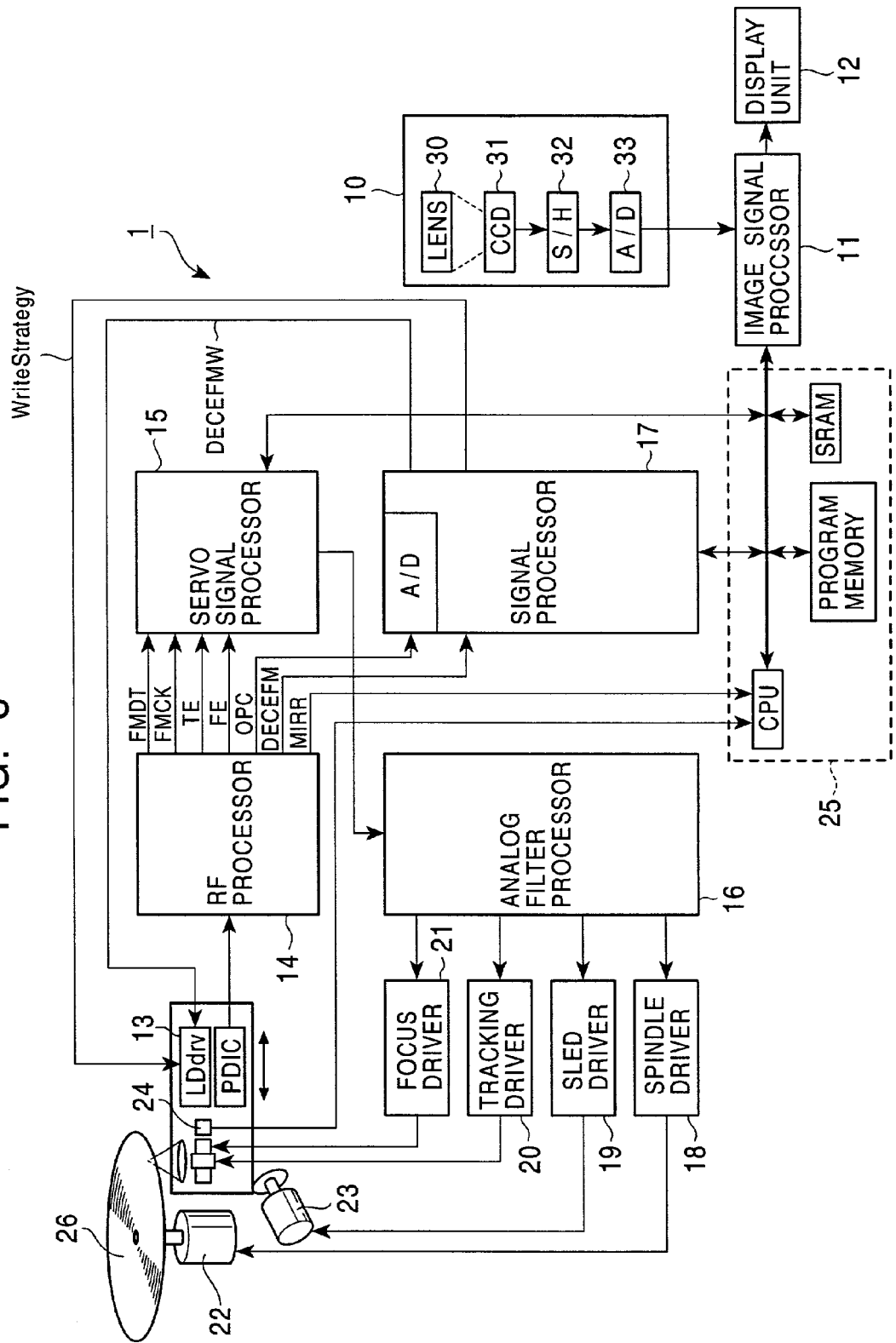
FIG. 3 is a block diagram of the structure of a digital still camera according to an embodiment of the present invention.

Referring to FIG. 3, the structure of the digital still camera of the embodiment is described. For example, the digital still camera reads data from and writes data to a recording medium. In this embodiment, a so-called disc-shaped CD-R is used as a write-once recording medium.

A digital still camera 1 includes an image pickup unit 10 for capturing an image of a subject; an image signal processor 11 for converting an image signal from the image pickup unit 10; a display unit 12 for displaying operating information for operating the digital still camera 1 and the image signal; an optical pickup (OP) 13 for reading data from and/or writing data to a recording medium (which will be described below); a radio frequency (RF) processor 14 for RF-processing the read signal; a servo signal processor 15 for generating a servo signal based on each signal from the RF processor 14; an analog filter processor 16 for generating an analog signal for controlling each driver based on the signal from the servo signal processor 15; a signal processor 17 for processing the read signal from the recording medium; a spindle driver 18 for controlling the rotation of a spindle motor 22; a sled driver 19 for controlling the operation of a sled motor 23; a tracking driver 20 for rocking an objective lens in the OP 13; a focus driver 21 for controlling the focus of a beam by vertically moving the objective lens in the OP 13 with respect to the disc recording medium; the spindle motor 22 for driving the disc recording medium; the sled motor 23 for moving the OP 13 in the radial direction of the recording medium; a vibration detector 24 for detecting vibrations; and a control unit 25 for controlling each part. The digital camera 1 writes captured image data to a recording medium 26 and reads image data from the recording medium 26.

The image pickup unit 10 includes a lens 30 for capturing an image of a subject; a charge coupled device (CCD) 31 for generating an image signal; a sampling/holding (S/H) circuit 32; and an A/D converting circuit 33 for converting an image signal into a digital signal. The CCD 31 generates an image signal based on an image of a subject from the lens 30 and supplies the generated image signal to the S/H circuit 32. The S/H circuit 32 samples and holds the image signal from the CCD 31 and supplies the image signal to the A/D converting circuit 33. The A/D converting circuit 33 converts the image signal from the S/H circuit 32 into a digital signal and supplies the digital signal to the image signal processor 11.

Under the control of a central processing unit (CPU), the image signal processor 11 performs image processing of the digital signal from the image pickup unit 10. Specifically, the image signal processor 11 performs color conversion from RGB signals into color-difference and chrominance signals, white balance processing, γ correction, reduced image processing, JPEG compression, and the like. The processed image signal is supplied to the signal processor 17. The image signal processor 11 supplies the processed image signal to the display unit 12.

The display unit 12 is, for example, a liquid crystal display (LCD), and displays the image signal from the image signal processor 11.

The OP 13 includes the objective lens, a laser diode (LD), a laser diode driver, a photodetector IC, a half mirror, and the like. The OP 13 detects an optical signal and outputs the optical signal to the RF processor 14. The OP 13 writes data to the recording medium 26 based on a decoded eight to fourteen modulation for write (DECEFMW) signal output from the signal processor 17 for flashing and driving the laser, an optimum power control (OPC) signal (write strategy) indicating the optimum value of the laser intensity, and the like.

The RF processor 14 samples and holds eight system signals consisting of a beam signal, side, and main, and performs arithmetic processing to generate signals such as a focus error (FE) signal, a tracking error (TE) signal, a mirror (MIRR) signal, an absolute time in pregroove (ATIP) signal, and a main read signal based on predetermined signals from among the eight system signals. From among the generated signals, the RF processor 14 outputs frequency modulation data (FMDT), a frequency modulation clock (FMCK), TE, and FE to the servo signal processor 15. The RF processor 14 outputs the OPC signal indicating the optimum value of the laser intensity and the DECEFMW signal for flashing and driving the laser, which are detected by test writing, to the signal processor 17. The RF processor 14 outputs MIRR to the control unit 25.

The servo signal processor 15 receives the FMDT, FMCK, TE, and FE from the RF processor 14. Under the control of the control unit 25, the servo signal processor 15 generates signals for controlling various servos inherent in optical discs and outputs the signals to the analog filter processor 16.

The analog filter processor 16 generates analog signals based on the control signals for various servos, which are output from the servo signal processor 15, and outputs the analog signals to the spindle driver 18, the sled driver 19, the tracking driver 20, and the focus driver 21.

Under the control of the control unit 25, the signal processor 17 receives the OPC and DECEFMW from the RF processor 14 and performs processing such as cross interleaved Reed-Solomon code (CIRC) decoding and encoding, write strategy, ADDr decoding, asymmetry computation, running optimum power control (OPC), and the like. When writing data to the recording medium 26, the signal processor 17 outputs the DECEFMW signal for flashing and driving the laser, the OPC signal indicating the optimum value of the laser intensity, and the like to the OP 13.

Based on the signal from the analog filter processor 16, the spindle driver 18 controls the rotation of the spindle motor 22.

Based on the signal from the analog filter processor 16, the sled driver 19 controls the sledding movement of the sled motor 23.

Based on the signal from the analog filter processor 16, the tracking driver 20 rocks the OP 13 and controls the position of a beam irradiation spot on the disc surface of the recording medium 26.

Based on the signal from the analog filter processor 16, the focus driver 21 moves the OP 13 vertically with respect to the disc surface of the recording medium 26, thereby performing focus control of the laser.

Based on the signal from the spindle driver 18, the spindle motor 22 rotates the recording medium 26.

Based on the signal from the sled driver 19, the sled motor 23 causes the OP 13 to sled.

The control unit 25 includes a program memory for storing a program for performing various processes, a static random access memory (SRAM) as a work area for temporarily storing VAT ICB and various data, and the CPU. The control unit 25 controls reading and writing of VAT ICB. The control unit 25 controls the overall apparatus by controlling each part.

Specifically, the SRAM is used as a work area for temporarily developing the VAT ICB fetched from the recording medium 26. A dynamic random access memory (DRAM) stores a correspondence table indicating the relationship between the VAT, which is updated every time a file or a directory is updated, added, or deleted, and logical addresses on the recording medium 26 on which the virtual partition begins. The DRAM stores the correspondence table until the main power supply of the digital still camera 1 is turned off.

The recording medium 26 is a write-once recording medium in which data is read and written based on the file system in compliance with the UDF. Specifically, the recording medium 26 has a disc shape and is a so-called CD-R.

Figure 4:
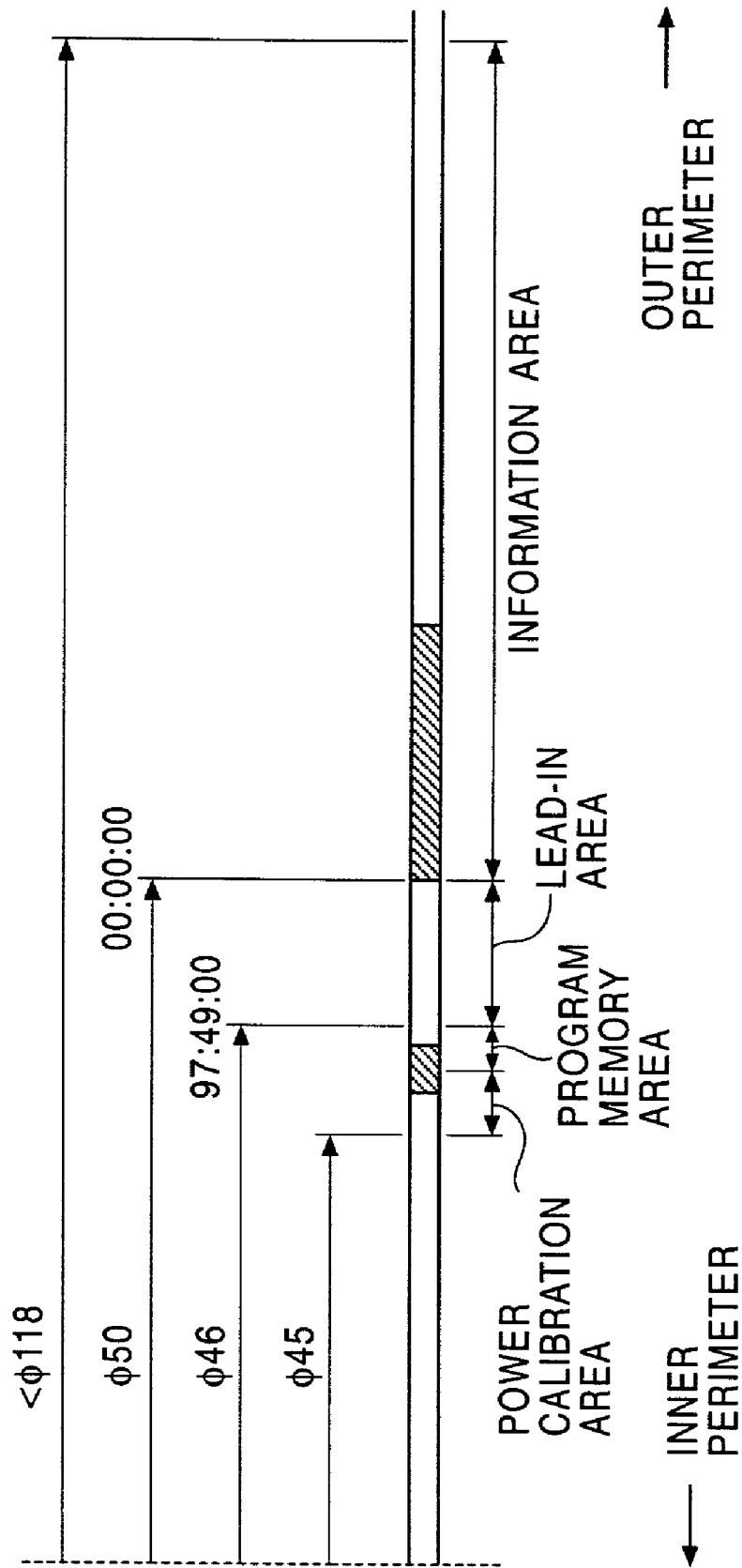
FIG. 4 is a sectional view, perpendicular to the surface of a recording medium, of the recording medium used in the digital still camera of the embodiment.
Figure 5:
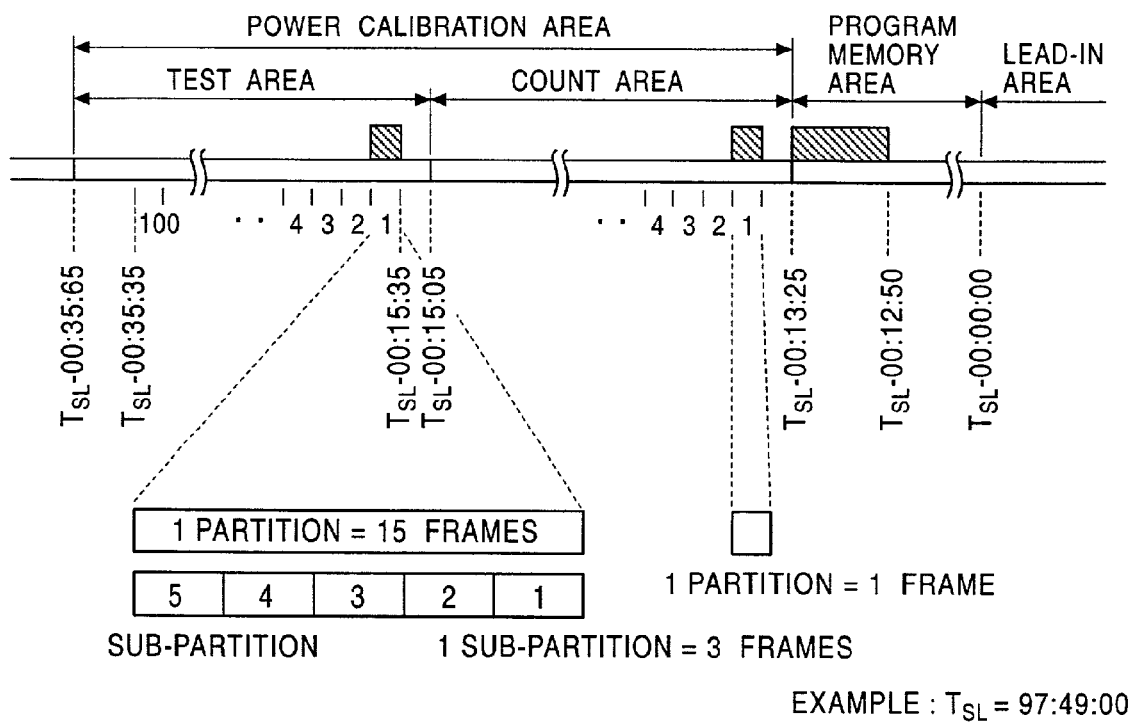
FIG. 5 is a sectional view, perpendicular to the surface of the recording medium, of the recording medium used in the digital still camera of the embodiment.

FIGS. 4 and 5 show cross sections of the recording medium 26. FIG. 4 is a vertical sectional view of the recording medium 26 with respect to the disc surface. FIG. 5 shows an enlarged view of the inner perimeter side of the sectional view shown in FIG. 4.

Referring to FIG. 4, the recording medium 26 includes a power calibration area (PCA), a program memory area (PMA), a lead-in area, and an information area.

Referring to FIG. 5, the power calibration area includes a test area for actually performing test writing and a count area for counting the start position of test writing and the number of times test writing is performed.

In FIGS. 4 and 5, shaded portions indicate written areas.

The test area is divided into 100 partitions. Each partition is designated by relative time from the start time of the lead-in area. Each partition consists of a minimum of one frame. Each partition is divided into five sub-partitions. One sub-partition is divided into three frames. Hence, each partition consists of a maximum of 15 frames. By utilizing the sub-partitions, test writing is performed immediately before writing, and hence the laser output is adjusted.

The operation of each component of the digital still camera 1 with the above arrangement for reading a signal recorded on the recording medium 26 will now be described.

A lens optical system in the OP 13 reads the laser diode light, which is reflected from the disc surface of the recording medium 26. Light from the lens optical system is converted by the photodetector IC (PDIC) into an electrical signal, and the electrical signal is sampled and held in the RF processor 14. Based on eight predetermined signals, signals such as FE, TE, MIRR, ATIP, and the main read signal are generated by arithmetic processing.

Characteristics of FE obtained by the RF processor 14 are adjusted by the servo signal processor 15, and FE passes through the analog filter processor 16 and is input to the focus driver 21. The focus driver 21 vertically moves a lens driving focus coil (not shown) in the OP 13 and adjusts the focus.

Similarly, the AC component of TE obtained by the RF processor 14 is removed by the servo signal processor 15, and TE undergoes digital processing. Subsequently, TE passes through the analog filter processor 16 and is input to the tracking driver 20. The tracking driver 20 adjusts a lens driving tracking coil in the OP 13 in the radial direction and adjusts the tracking.

Also, the DC component of TE obtained by the RF processor 14 is removed by the servo signal processor 15, and TE undergoes digital processing. Subsequently, TE passes through the analog filter processor 16 and is input to the sled driver 19. The sled driver 19 activates the sled motor 23 and moves the overall OP 13 in the radial direction of the recording medium 26 and adjusts the sledding movement. During the seek operation, the voltage for performing the sled control is intentionally applied from the outside. As a result, the sled motor 23 is forcedly driven.

Accordingly, the tracking operation for adjusting only the lens in the radial direction is performed based on the AC component of TE, and the sled operation for moving the overall OP 13 in the radial direction is performed based on the DC component of TE.

The detecting signal (MIRR) which indicates a variation in the reflectivity of the recording medium 26, which is output from the RF processor 14, is detected when the OP 13 crosses a track. By counting MIRRs, the CPU can detect the current seek position and the current read position and can start and stop the optical pickup operation.

The spindle motor 22 is controlled based on ATIP processing. In a spiral groove referred to as a wobbling groove, which is written on the recording medium 26, time information is recorded by performing frequency modulation at a center frequency of 22.05 kHz±1 kHz in the radial direction. In this frequency modulation, time information referred to as ATIP, which is Bi-phase-modulated, is modulated.

When the focus and the tracking are in concordance with each other, a wobble signal is generated based on a predetermined combination of eight input signals. The wobble signal undergoes frequency modulation and ATIP decoding, and a clock signal (FMCK) which corresponds to the center frequency and time information (FMDT) are generated.

The FMDT is classified as media absolute time position by the servo signal processor 15, that is, it is classified as address and additional information, and is stored in a predetermined register. Accordingly, the CPU performs reading via a bus.

In the read operation, the RF processor 14 generates a signal which corresponds to a recording pit, based on a predetermined combination of the eight signals. The generated signal undergoes equalization and is supplied to the signal processor 17 in which the signal remains in the EFM signal format. The signal processor 17 performs CIRC decoding and obtains the desired data.

The write operation will now be described. In the write operation, a pickup is moved to the lead-in area, and ATIP information is read. From among the ATIP information, special information 2 is read.

FIG. 6 shows the frame structure of the ATIP written in the lead-in area. In a frame with the frame number N, special information 1 is written. In a frame with the frame number (N+10), special information 2 is written. In frames with the frame numbers (N+1) to (N+9) subsequent to special information 1 and in frames with the frame numbers (N+11) to (N+19) subsequent to special information 2, normal time codes are written.

In each special information area which is written every ten frames, the start position of the lead-in area of the recording medium 26 is written as time information. In special information 2 area with the frame number (N+10), which is to be read in this example, the start position of the lead-in area is written as time information in a predetermined format.

For example, when the lead-in area starts at a position at which 2 minutes and 11 seconds have elapsed since the recording start point of the recording medium 26, a digital signal of time information indicating 97 minutes and 49 seconds, which is obtained by subtracting 2 minutes and 11 seconds from total recording time of 100 minutes, is written in the special information 2 area of the recording medium 26. In other words, time information "97:49:00" is written as "1001 0111 0100 1001 0000 0000".

Figure 7:
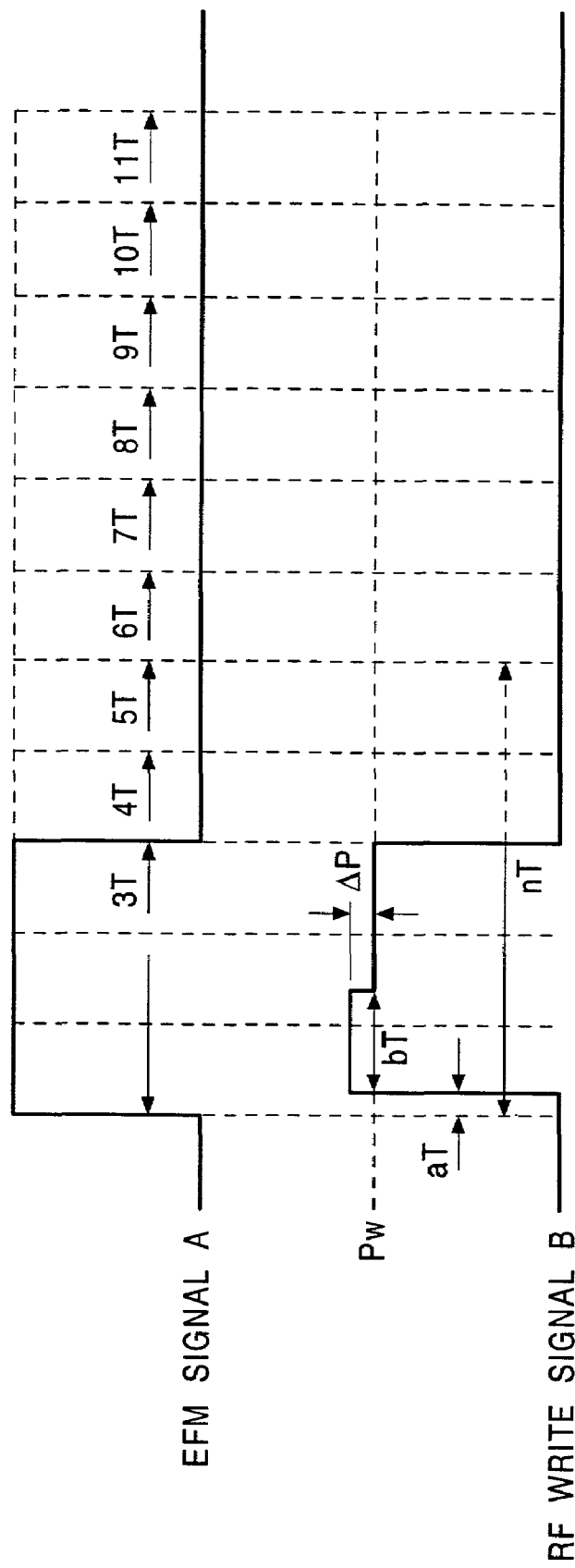
FIG. 7 is a diagram showing the intensity of an eight to fourteen modulation (EFM) signal varying with time and the intensity of a radio frequency (RF) signal when the EFM signal is written.

The information written in the special information area corresponds to an identification code for identifying a recording medium. A recording-medium reading apparatus stores in advance a table indicating the relationship between a write strategy parameter which corresponds to the identification code and other related parameters. A write strategy is a correction parameter for adjusting the duration and level of a write laser pulse for each pit so that the pit size after the writing is in accordance with the standard. The reading apparatus is provided in advance with a write strategy for each recording medium. Referring to FIG. 7, a recording signal in accordance with the write strategy is described in detail.

FIG. 7 shows an EFM signal A and an actual RF write signal B for writing the EFM signal A. The RF write signal B in accordance with the write strategy starts writing after a delay aT. In the initial writing period (bT), writing is performed with an output which is larger than Pw by ΔP. Subsequently, writing is performed with the output Pw.

Next, the optimum power calibration (OPC) operation for determining the optimum value of the laser output is performed. While the above-described write strategy is precise control of the laser for each pit, the OPC operation computes the optimum value of the laser output for the overall write operation. The OPC operation is performed in order to obtain a pit writing preset value for achieving a desired value for ideal reading.

The OPC operation is performed in the test area of the PCA. The test area is divided into 100 partitions, and each partition is designated by relative time from the start position of the lead-in area. Each partition is divided into a maximum of fifteen frames. By using one partition, test writing is performed prior to performing the actual writing. Hence, the laser output can be adjusted.

Specifically, the laser output is changed in a stepwise manner starting from a predetermined value, and writing to the recording medium 26 is performed step by step. The laser output is read, and an asymmetry value at each step is measured. Linear approximation is performed using a preset value in the vicinity of a desired asymmetry, and hence a preset value of the laser output which indicates the desired asymmetry value is obtained.

Figure 8:
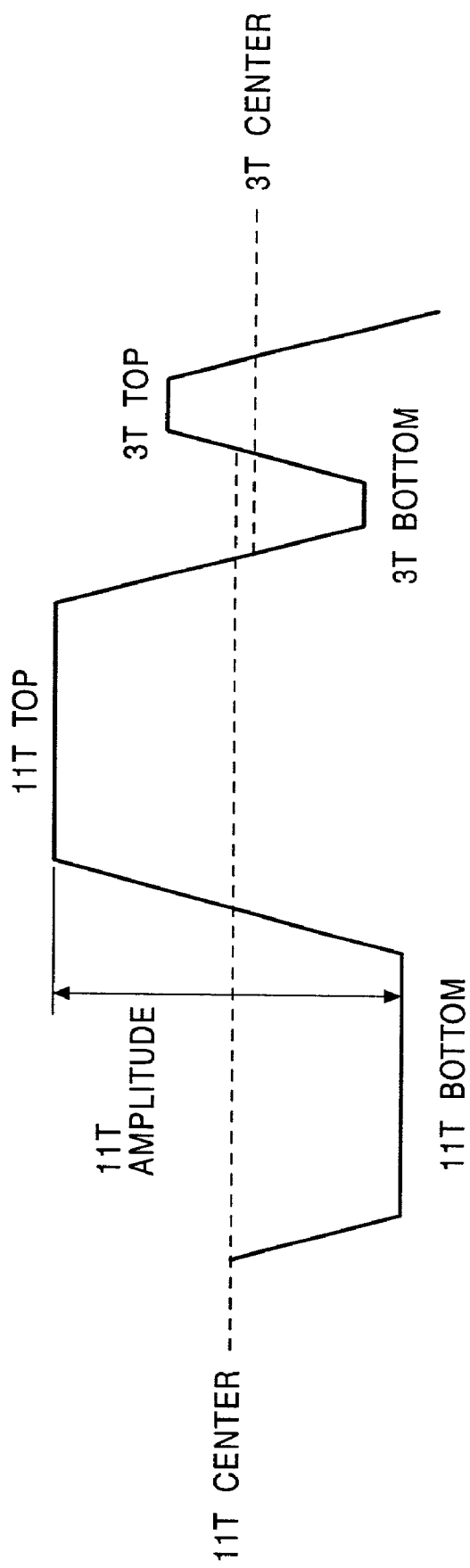
FIG. 8 illustrates the demodulation level of a pit used for computing an asymmetry value for each recording medium by the digital still camera of the embodiment.

An asymmetry value is a value which defines a gap between the center level of 3T pit/land and the center level of 11T pit/land. The asymmetry value is computed by the following equation (1). FIG. 8 shows the demodulation level used to compute the asymmetry value.

$$\text{asymmetry value (\%)} = (3T\ \text{center} - 11T\ \text{center})/11T\ \text{amplitude} \ldots \quad (1)$$

A desired asymmetry value is an ideal value which minimizes the jitter value. The asymmetry value is included in write strategy parameters as a value inherent in the recording medium 26. The asymmetry value corresponds to the start position information of the lead-in area of the recording medium 26 and is stored beforehand. In this example, the desired asymmetry value is set to −5%.

Figure 9:
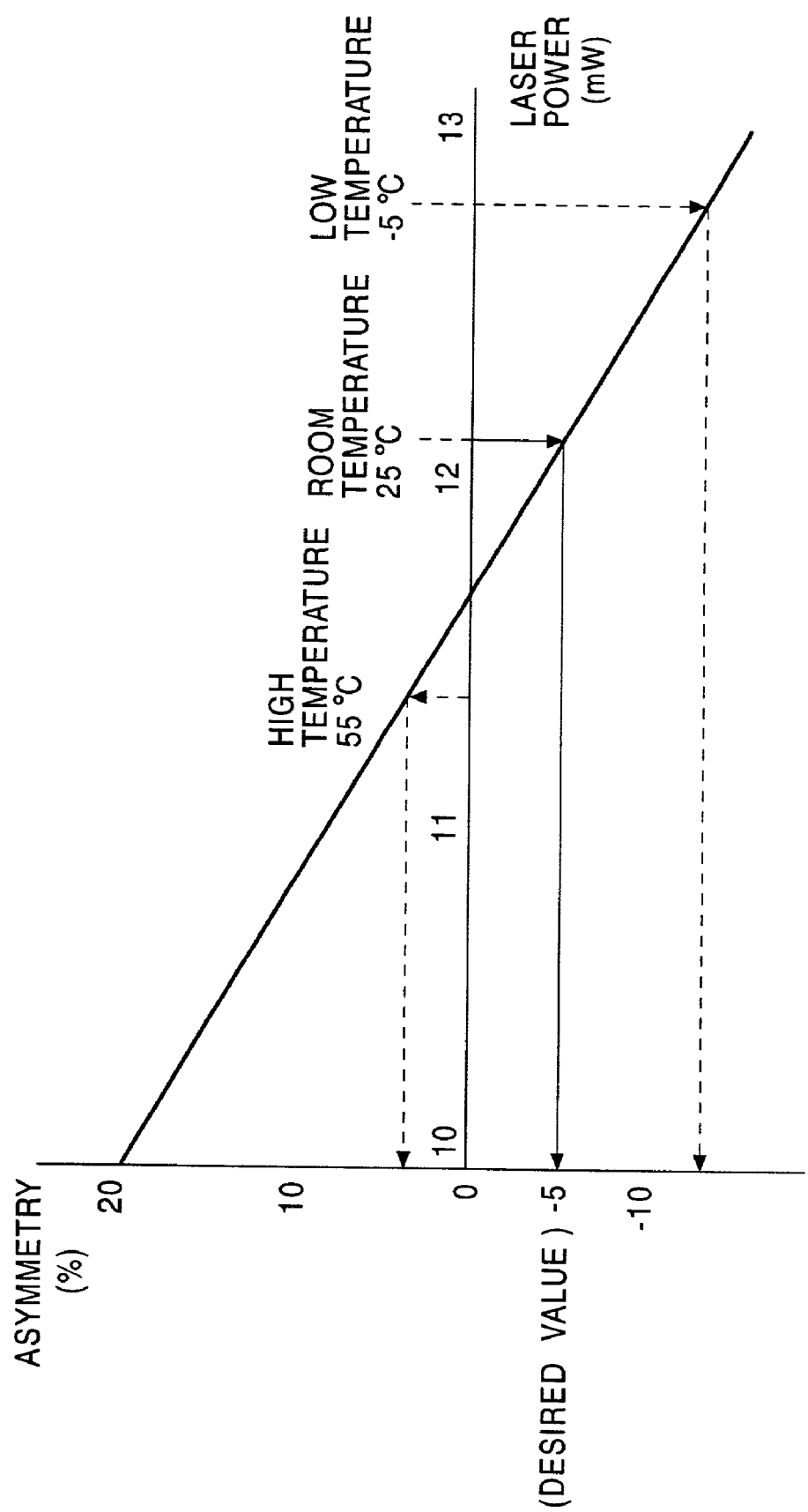
FIG. 9 is a graph showing the relationship between the laser output for writing data to the recording medium by the digital still camera of the embodiment and the asymmetry value after the data is written.

FIG. 9 shows the relationship between the laser output when writing is performed and the asymmetry value after writing is performed. As is clear from FIG. 9, the laser output when writing is performed is proportional to the asymmetry value after writing is performed. In general, the laser diode used as the optical pickup for CD-R has a large variation in laser output relative to the operating environmental temperature. When the laser output is preset so that it achieves the desired asymmetry value at room temperature, as shown in FIG. 9, the laser output varies greatly with the environmental temperature. As a result, as is clear from a graph in FIG. 10 which shows the relationship between the asymmetry value and the recording jitter value, variation in the asymmetry value influences a deterioration of the recording jitter value.

It is therefore necessary to perform the OPC operation which determines the optimum value of the laser output immediately before the write operation. After the optimum setting of the laser output is performed in accordance with the foregoing procedure, each parameter which is prepared as a fixed value is set, and hence the optimum writing is implemented. The asymmetry value is obtained by an A/D converter and is measured by the signal processor 17.

In the count area of the PCA, when the OPC operation is performed, if any one of the sub-partitions in each partition is used, a corresponding partition in the count area becomes filled. When performing the OPC operation later, unused sub-partitions in a used-partition of the PCA are sought for prior to performing the OPC operation.

Specifically, the write operation is performed as follows. The signal processor 17 performs CIRC encoding and EFM encoding of compressed captured image data in the SRAM, and outputs the DECEFMW signal for flashing and driving the laser, which is required for pit formation, and the OPC (write strategy) signal which indicates the optimum value of the laser intensity to the laser diode driver in the OP 13.

Writing is performed with predetermined timing in accordance with a file system based on an address in frame which is obtained based on the FMDT signal obtained by decoding the ATIP.

In the initial writing, writing starts at a position after a gap of approximately 20 Mbytes, which is to be used as the lead-in area when session closing is performed later.

When writing of additional data is not performed to a write-once recording medium, or when reading the recording medium using another reading apparatus such as a CD-ROM drive, it is necessary to perform finalization (session closing) in which the lead-in area and the lead-out area are written, in order to enable the CD-ROM drive to read the recording medium.

In this embodiment, the finalization process (session closing) is controlled in accordance with certain conditions. Specifically, the control of session closing includes starting session closing after a predetermined period of time elapses since the execution of session closing is selected by a user and displaying of the time remaining before the start of session closing. Also, when the user selects the execution of session closing after the countdown is completed, it is requested that the digital still camera should be placed on a stable object. When the vibration detector detects vibrations, session closing is not started.

More specifically, when the execution of session closing is selected, the digital still camera 1 displays that it should be situated in a stable place. After the digital still camera 1 is securely placed, the user is notified to press a confirmation button.

The duration between the selection of the execution of session closing and the start of session closing is, for example, five seconds. When the confirmation button is pressed, the countdown begins.

When vibrations are detected by the vibration detector during the countdown, the countdown to session closing is stopped.

FIG. 11 shows a process of performing a session closing process by the digital still camera 1 of the embodiment.

When a user selects the execution of session closing, in step S1, the control unit 25 reads a provisional TOC written in the PMA of the recording medium 26.

In step S2, the control unit 25 creates a normal TOC based on the provisional TOC.

In step S3, the control unit 25 displays a warning to place the digital still camera 1 in a stable place and to confirm that it is ready to perform session closing. For example, the warning "Please place the camera in a stable place. If it is ready, please press the confirmation button" is displayed.

In step S4, the control unit 25 determines whether the confirmation button is pressed. If it is determined that the confirmation button is pressed, in step S5, the control unit 25 displays the countdown indicating the time remaining before the start of session closing. For example, the countdown "5→4→3→2→1→ session is being closed" is displayed.

In contrast, if the process cannot determine in step S4 that the confirmation button is pressed, the process repeats step S4.

During the countdown, when the vibration detector detects vibrations, the process performs processing which prohibits the digital still camera 1 from performing session closing. For example, the process is repeated from step S3 or the digital still camera 1 is disabled from performing session closing. As a result, failures in session closing are prevented.

When no vibrations are detected, the countdown is properly completed. In step S6, the process starts session closing. When session closing is started, the control unit 25 first writes to a lead-out area. Specifically, the control unit 25 writes information so that zero is embedded in the lead-out area.

When the writing to the lead-out area is completed, in step S7, the process writes to a lead-in area. Specifically, the process repeatedly writes the normal TOC created in step S2.

When the writing to the lead-in area is completed, the control unit 25 displays in step S8 that session closing is completed, and the process is terminated. For example, the message "session closing is completed" is displayed.

According to the digital still camera 1 of the embodiment of the present invention, when the execution of session closing is instructed, session closing is started after a predetermined period of time. A user is instructed to place the digital still camera 1 in a secure place. When the vibration detector detects vibrations, session closing is not performed. It is thus possible to prevent the occurrence of trouble such as failure in session closing and incomplete session closing.

While the present invention has been described with reference to what are presently considered to be the preferred embodiments, it is to be understood that the invention is not limited to the disclosed embodiment. On the contrary, the invention is intended to cover various modifications and equivalent arrangements included within the spirit and scope of the appended claims.

What is claimed is:

1. An optical recording apparatus for recording data on a recording medium by optical recording, comprising:
    write means for writing data to said recording medium; and
    control means for controlling session closing for enabling another reading apparatus to read the written data;
    wherein said control means performs session closing in accordance with conditions for session closing; and
    said control means starts session closing after a predetermined period of time elapses since reception of a signal to perform session closing.

2. An optical recording apparatus according to claim 1, wherein said control means displays the remaining time from the reception of the signal to perform session closing until the start of session closing.

3. An optical recording apparatus according to claim 1, wherein said control means confirms, after the predetermined period of time elapses since the reception of the signal to perform session closing, whether to perform session closing.

4. An optical recording apparatus according to claim 1, wherein said control means gives, after the reception of the signal to perform session closing, a warning to put said optical recording apparatus on a steady object.

5. An optical recording apparatus according to claim 1, further comprising vibration detecting means for detecting vibrations, wherein said control means does not start session closing when said vibration detecting means detects vibrations.

6. An optical recording apparatus according to claim 1, wherein said recording medium comprises one of a write-once recording medium and a rewritable recording medium.

7. An optical recording apparatus according to claim 5, wherein said control means starts session closing after a predetermined period of time elapses since reception of a signal to perform session closing.

8. An optical recording apparatus according to claim 7, wherein said control means displays the remaining time from the reception of the signal to perform session closing until the execution of session closing.

9. An optical recording apparatus according to claim 7, wherein said control means does not start session closing when said vibration detecting means detects vibrations within the predetermined period of time from the reception of the signal to perform session closing.

10. An optical recording method for recording data on a recording medium by optical recording, comprising the steps of:
    writing data to said recording medium; and
    performing session closing for enabling another reading apparatus to read the written data in accordance with conditions for session closings,
    wherein session closing is started after a predetermined period of time elapses since reception of a signal to perform session closing.

11. An optical recording method according to claim 10, wherein the remaining time from the reception of the signal to perform session closing until the start of session closing is displayed.

12. An optical recording method according to claim 10, wherein, after the predetermined period of time elapses since the reception of the signal to perform session closing, it is confirmed whether to perform session closing.

13. An optical recording method according to claim 10, wherein, after the reception of the signal to perform session closing, a warning is given to put said optical recording apparatus on a steady object.

14. An optical recording method according to claim 10, further comprising a vibration detecting step of detecting vibrations, wherein, when vibrations are detected in said vibration detecting step, session closing is not started.

15. An optical recording method according to claim 10, wherein said recording medium comprises one of a write-once recording medium and a rewritable recording medium.

16. An optical recording method according to claim 14, wherein session closing is started after a predetermined period of time elapses since reception of a signal to perform session closing.

17. An optical recording method according to claim 16, wherein the remaining time from the reception of the signal to perform session closing until the execution of session closing is displayed.

18. An optical recording method according to claim 16, wherein session closing is not started when vibrations are detected, in said vibration detecting step, within the predetermined period of time from the reception of the signal to perform session closing.

19. A digital still camera, comprising:
    image pickup means for capturing an image of a subject;
    image processing means for processing the captured image data;
    read-write means for reading data from and/or writing data to a recording medium; and
    control means for controlling session closing for enabling a reading apparatus to read the recorded data,
    wherein said control means performs session closing in accordance with conditions for session closing; and
    said control means starts session closing after a predetermined period of time elapses since reception of a signal to perform session closing.

20. A digital still camera according to claim 19, wherein said control means displays the remaining time from the reception of the signal to perform session closing until the start of session closing.

21. A digital still camera according to claim 19, wherein said control means confirms, after the predetermined period of time elapses since the reception of the signal to perform session closing, whether to perform session closing.

22. A digital still camera according to claim 19, wherein said control means gives, after the reception of the signal to perform session closing, a warning to put said optical recording apparatus on a steady object.

23. A digital still camera according to claim 19, further comprising vibration detecting means for detecting vibrations, wherein said control means does not start session closing when said vibration detecting means detects vibrations.

24. A digital still camera according to claim 23, wherein said control means starts session closing after a predetermined period of time elapses since reception of a signal to perform session closing.

25. A digital still camera according to claim 24, wherein said control means displays the remaining time from the reception of the signal to perform session closing until the execution of session closing.

26. A digital still camera according to claim 24, wherein said control means does not start session closing when said vibration detecting means detects vibrations within the predetermined period of time from the reception of the signal to perform session closing.

27. A digital still camera according to claim 24, wherein said recording medium comprises one of a write-once recording medium and a rewritable recording medium.

* * * * *